Jan. 3, 1956  J. C. MATHIESEN  2,729,106
AIR-SUPPORTED GYROSCOPE
Filed Nov. 1, 1952  2 Sheets-Sheet 1

INVENTOR.
JAMES C. MATHIESEN
BY
ATTORNEY

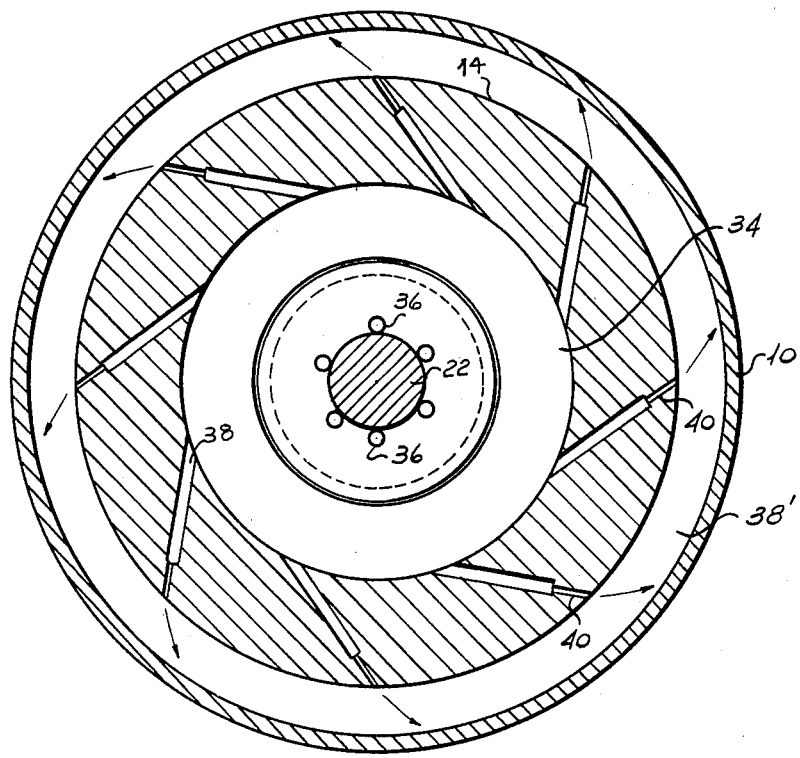
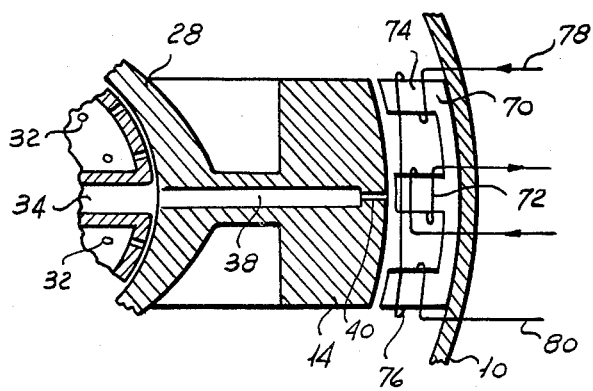

United States Patent Office 2,729,106
Patented Jan. 3, 1956

2,729,106

AIR-SUPPORTED GYROSCOPE

James C. Mathiesen, Pleasantville, N. Y., assignor, by mesne assignments, to Norden-Ketay Corporation, a corporation of Illinois Application November 1, 1952, Serial No. 318,186

7 Claims. (Cl. 74—5.7)

My invention relates to an air-supported gyrosocope and more particularly to a gyroscope in which the rotor is supported by an air bearing formed along the surface of a sphere.

Gyroscopes of the prior art have been universally mounted so that the spin axis will have 2 degrees of freedom. This has been accomplished by supporting the housing for the gyroscope, which carries the rotor shaft, in a pair of gimbal rings. The friction in the gimbal-ring bearings causes precessional errors which constrain the gyroscope to drift.

One object of my invention is to provide an air bearing for a gyroscope which will reduce the friction between its rotor and its support.

Another object of my invention is to provide a spherical air bearing whereby the spin axis of the gyroscope may be mounted with 2 degrees of freedom without the necessity of employing gimbal rings.

Another object of my invention is to provide a gyroscope which may act as a true "space fixed" reference and in which precessional errors due to friction are greatly minimized.

Other and further objects of my invention will appear from the following description.

In the accompanying drawings which form part of the instant specification and which are to be read in conjunction therewith and in which like reference numerals are used to indicate like parts in the various views:

Figure 2 is a sectional view drawn along the line 2—2 of Figure 1.

Figure 4 is a fragmentary sectional view drawn on an enlarged scale showing the mode of providing sensing means between the gyroscope housing and the gyroscope rotor.

Figure 1:
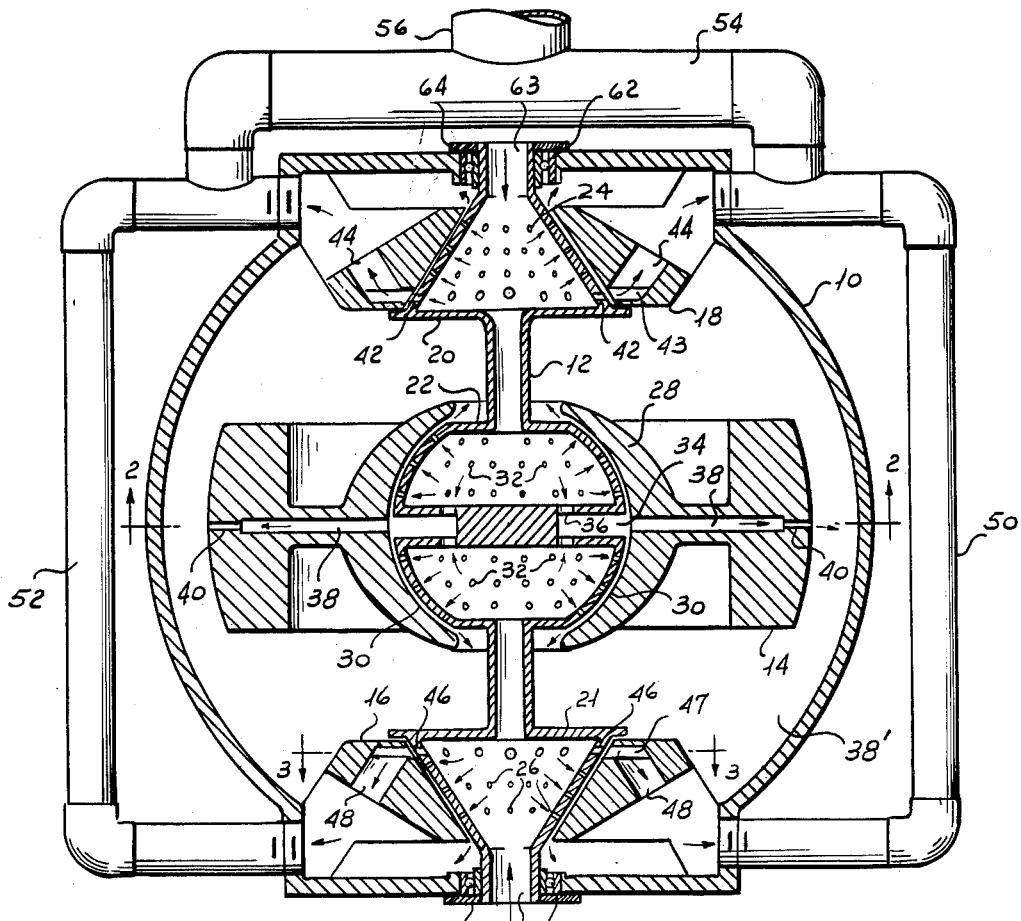
Figure 1 is a diagrammatic sectional elevation showing a gyroscope containing one embodiment of my invention.
Figure 3:
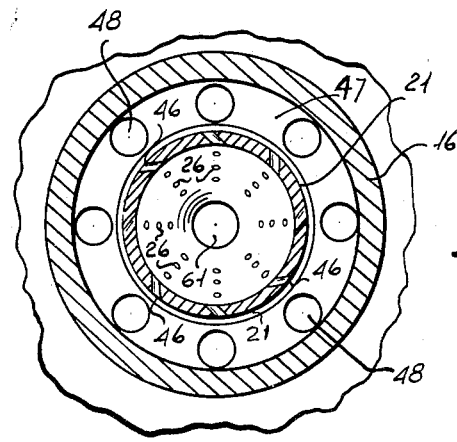
Figure 3 is a fragmentary sectional view taken along the line 3—3 of Figure 1.

Referring now to Figure 1, a gyroscope housing 10 can be made of any appropriate material and formed in any suitable shape. A central hollow member 12 formed symmetrically with the spin axis of the gyroscope rotor 14 is mounted in the case 10 in a pair of conical bearings 16 and 18. The member 12 is provided with hollow journal portions 20 and 21, each having an external surface formed along the locus of a cone congruous to the internal surfaces of the coacting conical bearings 18 and 16. The central portion of the hollow shaft 12 is formed with a bearing member 22 whose external surface is formed along the locus of a sphere. The conical journal member 20 is formed with a plurality of openings 24 for the passage of air in a manner to form an air bearing, as will be pointed out more fully hereinafter. In a similar manner, the conical journal member 21 is formed with a plurality of openings 26, likewise adapted to supply air for the formation and maintenance of an air bearing. The gyroscope rotor 14 is formed with a journal 28 whose surface 30 lies along the locus of a sphere. The bearing member 22 is formed with a plurality of openings 32 similar to the openings 24 and 26 through which air is adapted to pass into the space between the external surface of the spherical bearing member and the surface 30 of the rotor to form and maintain an air bearing. The diametrical clearance between the surfaces forming the spherical air bearing is in the order of two thousandths of an inch. The spherical bearing member 22 is formed with an annular chamber 34 which communicates through ports 36 with the interior space 38' of the housing 10. A plurality of angularly disposed, generally radially extending passageways 38 are formed in the rotor 14 adapted to communicate with the annular manifold 34. The passageways 38 terminate in nozzles 40, which are adapted to jet air into the space 38' within the housing 10, as will be pointed out more fully hereinafter. The diameter of the nozzles 40 may be approximately between two and three thousandths of an inch. The angularly directed nozzles 40 cause the rotor to act as a reaction turbine. Their action rotates the rotor 14.

The conical member 20 is provided with a plurality of angularly directed nozzles 42, which are adapted to jet air into an annular chamber 43 which communicates with passageways 44 formed in the conical bearing member 18. In a similar manner the conical journal member 21 is provided with a plurality of angularly directed nozzles 46 which are adapted to jet air into an annular chamber 47. This annular chamber communicates with a plurality of ports 48 formed in the conical bearing member 16. The ports 44 and the ports 48 communicate with the interior of the housing 10. The interior of the housing is maintained at a pressure below atmospheric through a plurality of manifolds 50 and 52, which communicate with the interior of the housing 10 and are carried thereby. The manifolds 50 and 52 communicate in turn with a low pressure manifold 54 which is connected by pipe 56 to any appropriate vacuum pump (not shown). The lower end of the axially disposed hollow member 12 may be supported from the housing 10 by a ball bearing 58. An annular plate 60 may be placed over the bearing to seal the housing. In a similar manner the upper end of the member 12 may be supported in a ball bearing 62 which is sealed by a plate 64.

An air pressure of about two pounds per square inch per gravity unit of acceleration is required to maintain a spherical bearing with a film of air about .002" in thickness, where the air bearing communicates with a nozzle having a cross-sectional area of between .002" and .003". The area of ports 36 is such as to create a substantially static pressure in the annular manifold 34 which supplies air to the angularly directed ports 40. This pressure will lie somewhere between the pressure within the hollow spherical bearing member 20 and the pressure within the space 38' in the housing 10. The design is such that the velocity head, due to the difference in pressure between the air in the annular chamber 34 and the air in the spherical bearing 22, does not act upon the rotor. In an ideal case, of course, the pressure within the manifold 34 is static, exhausting through the ports 40 at a rate equal to that to which air is supplied to the chamber 34. After the air bearing is established, there will be some friction between the spherical bearing member 22 and the rotor 14 through the surfaces which move relative to each other on opposite sides of the supporting film of air. This friction, while small, is adapted to create precessional forces especially when the plane of the rotor moves to a position not at right angles to the axis of the hollow member 12. In order to minimize these precessional forces, I spin the hollow member 12 through the angularly disposed nozzles 42 and 46 in the conical journals in the same direction as the rotor 14 spins, the angularly disposed nozzles 42 and 46 acting as reaction turbine nozzles and effecting the desired rotary motion of the journals 20 and 21 and hence the hollow shaft 12 and the hollow spherical bearing 22. This transfers a portion of the friction to the housing 10 around the shaft 12, where it will exercise no precessional effect. In this manner my gyroscope acts as a "spaced fixed" reference. In order to enable my gyroscope to act as an "earth fixed" reference, an erecting system, together with a gravity-sensing means such as known to the art (not shown), may be readily applied.

It is to be understood that while I have shown an air-sustained gyroscope rotor, any appropriate means for driving the rotor known to the art may be employed. For example, I may use a rotating magnetic field whose stator windings are supported in the housing 10 as is well known to the art and is therefore not shown or described.

It will be further understood by those skilled in the art that if we immobilize the shaft 12, the friction between the rotor and its bearing through the air film will exercise an erecting torque due to the loss of symmetry in the air bearing, as would occur when the ends of the spherical journal 28 move out of opposition with the ends of the spherical rotor surface. This action is minimized by rotating the hollow member 12 as described above, when it is desired to have a "space fixed" reference.

Since it is important to maintain the interior surface of the spherical journal 28 and the external surface of the spherical bearing 22 in a polished condition to maintain an efficient air bearing, the hollow member 12 is mounted at its upper and lower ends in friction-reducing ball bearings 58 and 62. Thus, when air pressure is being built up in bringing the gyroscope rotor 14 to speed or when air pressure is being reduced to slow the gyroscope rotor down preparatory to stopping it, there will be momentary metal-to-metal contact between the journal 28 and the spherical bearing 22. Since the spherical bearing member 22 is rotating in the same direction as the rotor and at substantially the same speed, this contact will occur with substantially no relative motion. The slight difference in speeds of rotation at the moment of contact will produce substantially no relative motion between the metal parts owing to the relatively small friction of the air bearings between the conical journals and the conical bearings which support the hollow member 12. When the air bearing is lost in the conical bearings, the parts will be moving at a relatively low speed. At this time, the ball bearing reduces friction so that the assembly will slow down to a smooth stop without causing relative motion between the touching parts of the spherical air bearing 22 and the spherical journal 28.

In operation, when it is desired to spin the gyroscope rotor, a vacuum is established in the manifold 54 which reduces the pressure in the space 38' in the housing 10. Air will be drawn through both sides of the hollow ends of the member 12 through openings 61 and 63 formed in the sealing plates 60 and 64. This air will jet out through the nozzles 42 and 46 and start to rotate the hollow member 12 and the spherical bearing 22 carrying the rotor 14 around with it. Until an air bearing is established, there will be momentary metal-to-metal contact between the rotor and its bearing. The air bearings at the ends of the shaft 12 and the spherical air bearing will be established almost immediately by the air jetting through the openings 24 and 26 in the case of the conical air bearings and through openings 32 in the case of the spherical air bearing. The air jetting through the angularly disposed nozzles 40 will start to rotate the rotor at the same time. It will be observed that the vacuum within space 38' reduces air friction of the rotor. The vacuum, therefore, accomplishes three results. It provides the necessary difference in pressure between atmospheric air and the pressure in space 38' within the housing 10 to enable the spinning jets for the shaft 12 and the spinning jets for the rotor 40 to operate. The difference in pressure, furthermore, provides for the flow of air which establishes the conical air bearings and the spherical air bearing, and finally the partial vacuum within the space 38' of the housing 10 reduces air friction for the rotor enabling it to spin at a high speed. Furthermore, the low pressure existing within the space 38' in which the rotor spins reduces the Magnus effect and minimizes precessional forces upon the rotor due to this effect.

The housing 10 may advantageously be mounted on gimbal rings such as are known in the art, and these gimbal rings may be driven by servo-motors (not shown) as is well known in the art.

The sensing mechanism for controlling servo-motors may be any appropriate sensing mechanism known to the art. One example of such a sensing means is shown in Figure 4 in which an E-transformer 70 is mounted on the interior of the housing 10 adjacent the rotor 14. In this case the rotor is made of any appropriate magnetic material or may be formed with a rim or band of magnetic material. The center pole of the E-transformer is excited by any appropriate alternating current of a suitable frequency and voltage. The upper pole 74 of the transformer carries a winding which is oppositely wound and connected in series with a second winding upon the lower pole 76. The series-connected, oppositely wound windings terminate in a pair of conductors 78 and 80 which go to the control circuit. When the housing 10 is displaced downwardly, as viewed in Figure 4, from the rotor 14 which rotates in a fixed position and space, the magnetic path between the center pole 72 and the lower pole 76 is lengthened, thus reducing the voltage generated in the winding on pole 76. A voltage of a predetermined phase will thus be generated across conductors 78 and 80. When the rotor 14 is in a central position, no voltage will be generated across conductors 78 and 80. As the housing 10 is displaced upwardly from the position shown in Figure 4, the voltage cross conductors 78 and 80 will be in the opposite phase from that generated in the downwardly displaced position. In this manner control about an axis perpendicular to the plane of the paper in Figure 4 is achieved. By the use of a second E-transformer (not shown) carried by the casing 10 in the plane of the rotor and displaced 90 degrees from the E-transformer 70, control about an axis 90 degrees from the axis just described may be achieved, as is well known in the art. By means of the signals generated in the sensing means, the servo-motors will continuously orient the casing 10 to maintain it in a position symmetrical with the rotor 14 as shown in Figure 1. Substantially none of the effort of orientation is taken from the gyroscope inertia, since the sensing means will exercise a very negligible force. The power for the orientation of the housing is derived from the servo-motors. Accordingly, the gimbal friction becomes a matter of no concern insofar as exercising precessional forces upon the gyroscope rotor is concerned. In this manner, I am able to maintain a stable reference plane for the control of any device for which gyroscopes are employed without encountering serious drifts or other errors introduced by gyroscopic systems of the prior art.

It will be seen that I have accomplished the objects of my invention. I have provided a novel gyroscope in which the gyroscope rotor is supported by a spherical air bearing. I have provided a gyroscope having an air bearing supported rotor in which the bearing itself is mounted in a pair of air bearings positioned around the spin axis of the gyroscope rotor. The means for maintaining the air bearings are also employed for spinning the gyroscope rotor and for spinning the shaft which supports the gyroscope rotor. Advantageously, the pressure employed to establish the air bearings and for spinning the rotor is air pressure acting through a reduced pressure established within the gyroscope housing. In this manner, air friction of the gyroscope rotor is reduced. My gyroscope may be used as a stable reference plane in space, capable of being used as a control in a wide variety of applications. My construction is such that a friction of the gimbal bearings commonly employed in gyroscopes of the prior art is substantially eliminated. My gyroscope rotor spins upon an air bearing with a minimum of friction. Accordingly, it may spin at a comparatively high speed without generating excessive friction or heat and thus provide a very stable reference plane.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. In a gyroscope, a housing, a hollow shaft extending through the housing and carried thereby, a bearing formed with a spherical surface supported by the shaft, a rotor having a journal formed with a spherical surface positioned concentrically with the spherical surface of the bearing, means communicating with the interior of the hollow shaft for introducing air under pressure between said spherical surfaces to form an air bearing film therebetween and means for rotating the rotor, the spherical surface of the journal subtending a greater angle at the concentric center of the spherical surfaces than that subtended by the spherical surface of the bearing.

2. In a gyroscope, a housing, a hollow shaft extending through the housing and carried thereby, a bearing formed with a spherical surface supported by the shaft, a rotor having a journal formed with a spherical surface positioned concentrically with the spherical surface of the bearing, means communicating with the interior of the hollow shaft for introducing air under pressure between said spherical surfaces to form an air bearing film therebetween, a plurality of radially extending ducts in said rotor communicating with the spherical intersurface space and a plurality of nozzles having a cross sectional area less than said ducts formed at the periphery of the rotor communicating with said ducts, said nozzles being angularly directed whereby to constitute the rotor a reaction turbine.

3. In a gyroscope, a housing, a hollow shaft extending through the housing and carried thereby, a bearing formed with a spherical surface supported by the shaft, a rotor having a journal formed with a spherical surface positioned concentrically with the spherical surface of the bearing, means communicating with the interior of the hollow shaft for introducing air under pressure between said spherical surfaces to form an air bearing film therebetween, means for rotating the rotor and means for rotatably mounting the hollow shaft.

4. In a gyroscope, a housing, a hollow shaft extending through the housing and carried thereby, a bearing formed with a spherical surface supported by the shaft, a rotor having a journal formed with a spherical surface positioned concentrically with the spherical surface of the bearing, means communicating with the interior of the hollow shaft for introducing air under pressure between said spherical surfaces to form an air bearing film therebetween, means for rotating the rotor and means for rotatably mounting the hollow shaft, said last-mentioned means comprising a pair of air bearings.

5. In a gyroscope, a housing, a hollow shaft extending through the housing and carried thereby, a bearing formed with a spherical surface supported by the shaft, a rotor having a journal formed with a spherical surface positioned concentrically with the spherical surface of the bearing, means for placing the interior of the housing under a reduced pressure, means providing communication between the atmosphere and the interior of the hollow shaft whereby to introduce air under pressure between said spherical surfaces to form an air bearing film therebetween and means for rotating the rotor.

6. In a gyroscope, a housing, a hollow shaft extending through the housing and carried thereby, a bearing formed with a spherical surface supported by the shaft, a rotor having a journal formed with a spherical surface positioned concentrically with the spherical surface of the bearing, means communicating with the interior of the hollow shaft for introducing air under pressure between said spherical surfaces to form an air bearing film therebetween, means for rotating the rotor and sensing means carried by the housing for producing a signal responsive to displacement of the housing with respect to the rotor.

7. In a gyroscope, a housing, a hollow shaft, a first conical bearing carried by the housing, a second conical bearing carried by the housing, a first journal formed with a conical surface carried by the hollow shaft adjacent one end thereof, a second journal formed with a conical surface carried by the hollow shaft adjacent the other end thereof, said conical journal surfaces being positioned symmetrically with the surfaces of said conical bearings, means communicating with the interior of the hollow shaft for introducing air under pressure between the surfaces of the journals and the bearings to form air bearing films therebetween, a bearing formed with a spherical surface carried by the shaft intermediate its ends, a rotor having a journal formed with a spherical surface positioned concentrically with the spherical surface of the bearing, means communicating with the interior of the hollow shaft for introducing air under pressure between said spherical surfaces to form an air bearing film therebetween and means for rotating the rotor.

References Cited in the file of this patent

UNITED STATES PATENTS

| | | |
|---|---|---|
| 1,499,602 | Bibbins | July 1, 1924 |
| 2,086,897 | Carter et al. | July 13, 1937 |
| 2,133,809 | Carter et al. | Oct. 18, 1938 |
| 2,142,018 | Carter | Dec. 27, 1938 |
| 2,474,072 | Stoner | June 21, 1949 |